June 2, 1959

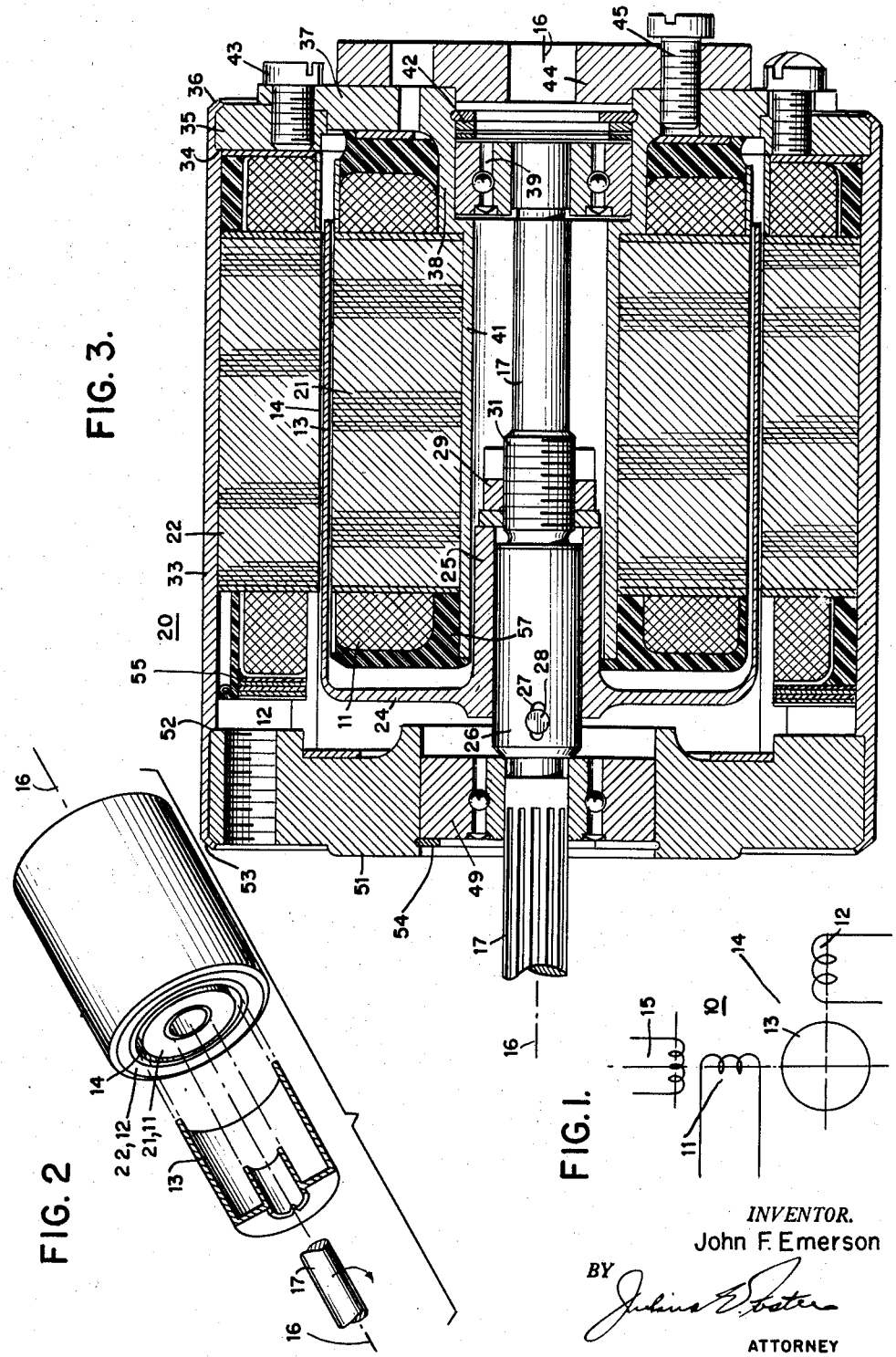

J. F. EMERSON 2,889,475

TACHOMETER WITH QUADRATURE SUPPRESSION

Filed May 9, 1957

INVENTOR.
John F. Emerson
BY
ATTORNEY

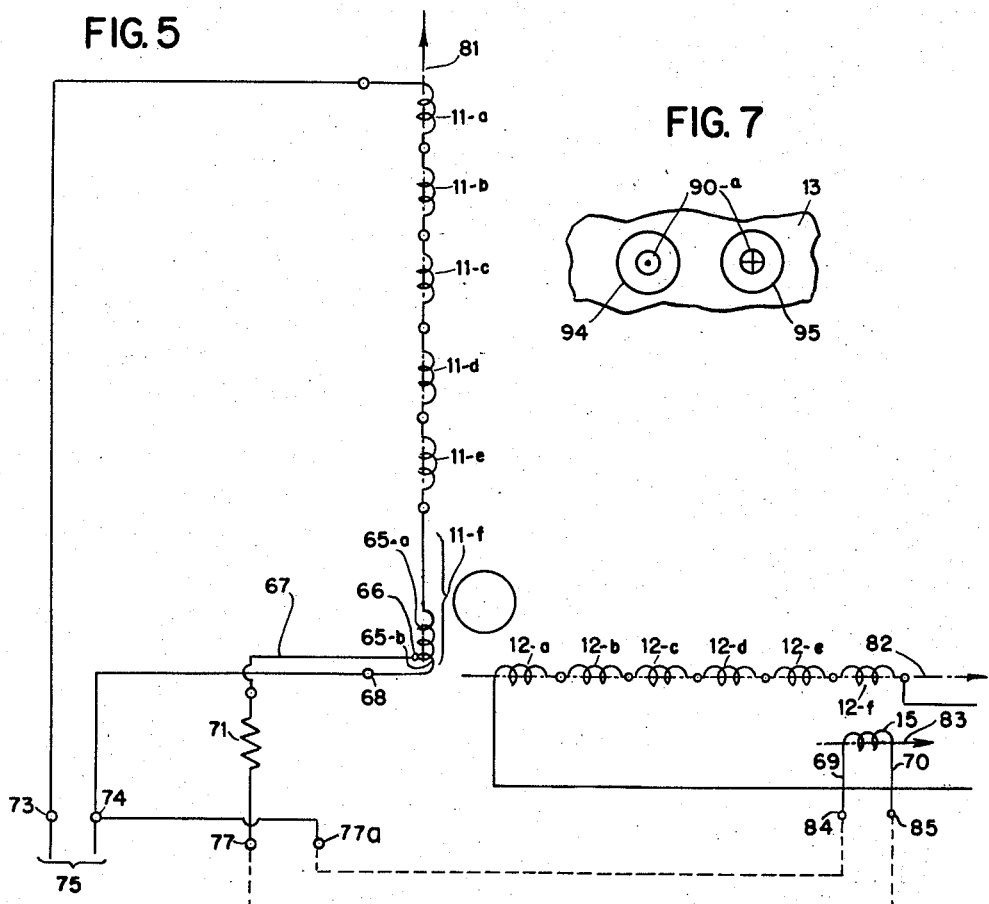

United States Patent Office 2,889,475
Patented June 2, 1959

2,889,475

TACHOMETER WITH QUADRATURE SUPPRESSION

John F. Emerson, Hasbrouck Heights, N.J., assignor to Kearfott Company, Inc., Little Falls, N.J., a corporation of New York Application May 9, 1957, Serial No. 658,070

19 Claims. (Cl. 310—171)

This invention relates to tachometer generators.

Tachometer generators are simply dynamoelectric devices for generating an electromotive force in a stationary winding, that bears a direct linear relationship to the angular velocity or rotational speed of a cup-shaped rotor that is part of the generator.

The tach generator construction usually includes a primary stationary winding distributed in radial slots of a cylindrical stator core that is concentric with the axis of rotation. A secondary core is concentrically disposed around the primary core and also supports a distributed stationary winding, but that secondary winding is angularly shifted with respect to the primary winding through an angle of 90° electrical degrees, so that the secondary winding is in quadrature electrical spacing from the primary winding.

The two stator cores are separated by a narrow cylindrical air gap, within which a rotor, in the form of a cup, is driven by the generator shaft at the speed of any suitable external device whose speed is to be measured by the corresponding voltage to be generated in the tach generator.

In another construction, both windings are disposed on the same inner core, in electrical quadrature spacing, within the rotor cup. An outer core, encircling the cup, serves to provide the magnetic return path for the inner core and defines the outer limit of the air gap around the inner core.

The tach generator is essentially a transformer with two stationary windings, whose electro-magnetic coupling is controlled by the rotatable cup. The cup is of non-magnetic material, and, when at rest, does not serve to couple the windings, and does not transfer any energy between them. However, when the cup rotates, it sets up a field in quadrature with the primary winding and thus energizes the secondary winding that is spaced 90 electrical degrees away from the primary.

In an ideal tach generator, no voltage or electro-motive force would be induced in the secondary winding while the rotor cup is at rest. The original disposition of the secondary winding, in electrical quadrature position relative to the primary winding, is intended to assure that no electromotive force will be generated in the secondary winding, from the primary winding, when the generator is at rest and the cup is not moving between the two windings.

However, because of the difficulty of actually controlling the disposition of the paths of travel of the entire electromagnetic flux field from a winding, some of the flux from the primary winding induces an undesired spurious electro-motive force in the secondary winding, even while the rotor cup is at rest. Moreover, such spurious electro-motive force represents a quadrature effect, and therefore adds to the real quadrature electro-motive force that is generated when the cup is in motion. The amplitude of the spurious quadrature voltage may be substantial relative to the amplitude of the real quadrature voltage to be induced in the secondary at the full speed of the tach generator. Such spurious electro-motive force, induced in the secondary winding, even while the cup is stationary and at rest, will continue to be induced during operation, and may be sufficient to destroy the substantial linearity that is otherwise desired and attainable under ideal conditions. Such spurious voltage is particularly troublesome, however, at relatively low speeds, and particularly at zero speed, when the cup is at rest, since the quadrature voltage over the lower speed range constitutes a substantial increasing proportion of the total electro-motive force induced in the secondary winding. In fact, when the cup is at rest, and no voltage at all should be induced in the secondary winding, the spurious quadrature voltage provides a substantial voltage at a time when, theoretically, the voltage should be zero.

These spurious quadrature voltages are generally due to out-of-phase components of the magnetic flux field of the primary winding. Such out-of-phase components of the flux field result from the non-uniformity of the paths for the magnetic flux.

The usual application of the tach generator is one that is intended to utilize the ideal linear voltage generating characteristics of the generator, as an accurate instrument, and anything that will contribute to and improve the accuracy of such an instrument is desirable. It is particularly important that the null reading, when the cup is at standstill, be zero or practically zero.

The primary object of this invention therefore is to provide a novel tach generator in which the ideal linearity characteristics may be more closely achieved.

Another object of this invention is to provide a tach generator of simple construction, wherein the generator itself provides a neutralizing correction voltage to suppress spurious quadrature voltages induced during the excitation of the generator.

Another object of the invention is to provide a tach generator in which a spurious quadrature voltage may be detected and suppressed or diminished independently of an operating quadrature voltage.

Another object of the invention is to provide a tach generator in which a spurious quadrature voltage may be detected, and in which a correcting voltage force may be derived to suppress or to eliminate the spurious quadrature voltage.

Another object of this invention is to provide a general winding feature in a dynamo-electric machine, whereby the induction of an undesired or spurious electro-motive force in a specified winding may be suppressed or reduced to a minimum.

One modification of the invention is disclosed herein, as applied to a tach generator, wherein there is provided, in addition to the usual primary and secondary stator windings, an auxiliary or tertiary winding, to serve as a control or correction winding.

The auxiliary or correction winding is energized from a small portion of the primary winding through a resistive circuit, to derive a small quadrature voltage across the correction winding. The auxiliary or correction winding is then physically disposed in electrical quadrature relative to the primary winding, to be in phase with the secondary winding. The auxiliary winding then acts as the primary of a transformer to induce a correction voltage into the secondary winding, in opposition to the spurious quadrature voltage component induced in the secondary winding by the leakage and eddy current fluxes from the primary winding.

By way of illustration of the practice of the invention, a tach generator will be described in which the primary and the secondary windings are in separate cores on opposite sides of the rotatable cup.

In one such tach generator to which the invention has been applied, the primary or input winding has six coils and a secondary or output winding also has six coils, with a single correction coil of few turns, which is sufficient to induce a correction quadrature voltage in the secondary winding to substantially suppress the spurious quadrature voltage. The correction coil is connected in a series resistive circuit across a few turns of one coil of the primary winding, and is supported in the magnetic core of the primary winding. The inductance of the correction coil provides the quadrature voltage component to induce the quadrature correction component in the secondary winding.

The manner in which the invention is applied to a tach generator is more fully illustrated and shown in the accompanying drawings in which:

Figure 1 is a schematic diagram of the winding disposition to illustrate and represent the electrical quadrature relation between the primary and the secondary windings of the tach generator, physically positioned directly adjacent a rotating non-magnetic cup, together with a correction winding out of the field of influence of the rotor cup;

Figure 2 is a perspective view of a tach generator showing the concentric disposition of two cores for the two stationary windings about an axis of rotation, with the rotatable non-magnetizable induction rotor cup shown withdrawn from its normal position in the concentric cylindrical air gap between the cores for the two windings;

Figure 3 is a longitudinal vertical sectional view of one form of construction of a tach generator, to which the present invention has been successfully applied;

Figure 5 is a schematic diagram of the several windings, to indicate the relative phase disposition of the windings;

Figure 7 is a schematic view of a portion of the cup or of a portion of a tooth face which is traversed by a leakage flux tube, and shows how the eddy currents arise that cause the spurious quadrature voltages; and Figure 8 is a vector diagram of the voltages in the circuit to the correction winding.

Figure 4:
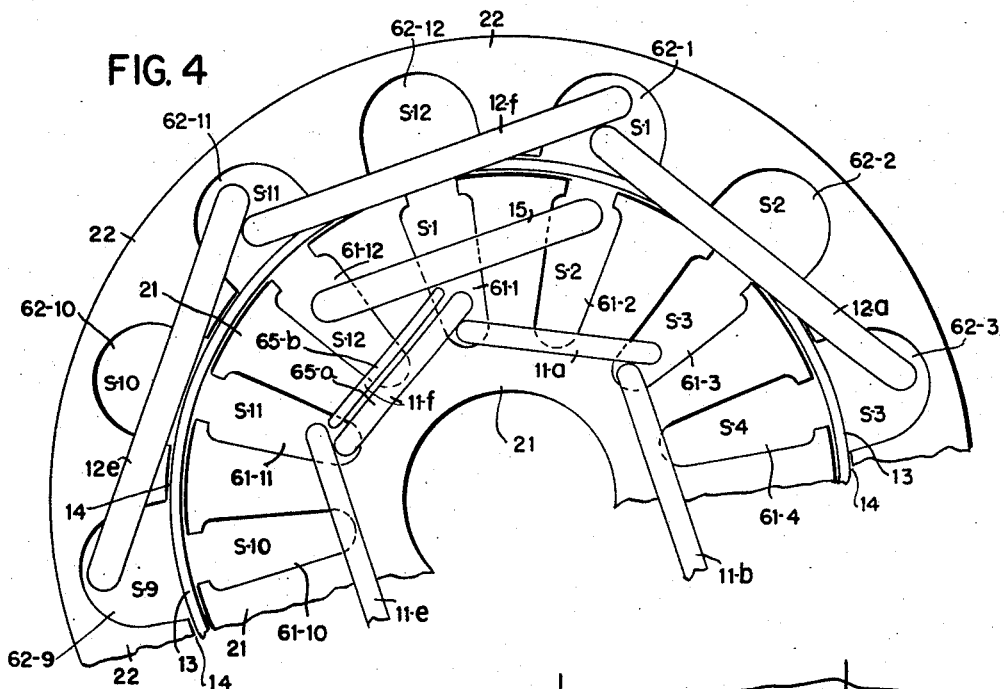
Figure 4 is a schematic end view of the two concentric cores and shows the relative location of the coils of the respective windings.

As shown in Figure 1 of the drawings, a tach generator 10 modified according to this invention, comprises a primary winding 11, a secondary winding 12, a rotor 13 disposed in a space or gap 14 between windings 11 and 12, and an auxiliary winding 15.

Both windings 11 and 12 are stationary, and are usually disposed on magnetic cores to define an air gap between them, in which the rotor 13 is rotated. The secondary winding 12 is disposed to be in electrical quadrature relative to primary winding 11. That means that the electromagnetic field from primary winding 11 should not induce any electro-motive force in the secondary winding 12 when the rotor is stationary and its influence is excluded. When the rotor cup 13 is rotated, however, between two windings 11 and 12, the cup serves as an energy transfer element, operating to transfer energy inductively from the primary winding 11 to the secondary winding 12, in direct proportion to the velocity or angular speed of the cup 13.

In the absence of any spurious induction effects between the primary winding 11 and the secondary winding 12, the rotary cup 13 will serve very accurately to induce in the secondary winding 12 an electro-motive force that is substantially a direct linear measure of the angular speed of the cup 13.

In the normal operation of the tach generator, when the rotor cup 13 is rotated, the induction transfer of energy from the primary winding 11 to the secondary winding 12 is the result of quadrature induction action. The rotating cup, cutting through the flux field of the primary winding 11, establishes a functional or real magnetic field electrically in phase quadrature relative to the field of the primary winding. Such real functional quadrature flux induces a corresponding electro-motive force in the secondary winding, and such electro-motive force is in effective space quadrature to the electro-motive force across the primary winding.

However, independently of the energy-transfer effect of the rotor cup 13, which acts solely during rotation, some of the flux of the electro-magnetic field from the coils of the stationary primary winding 11 links with the juxtaposed coils of the stationary secondary winding 12. The disposition of secondary winding 12 is such that the flux interlinkages with the turns of the coils of winding 12 should neutralize and balance out. However, certain components of the flux field appear to be out of time phase and therefore do not cancel out. Consequently, they induce in the secondary winding 12 a spurious quadrature electromotive force that is in no way due to the rotation of the rotary cup 13. Such spurious quadrature electro-motive force exists under all operating conditions of the cup, both while stationary and while rotating. Similarly, such magnetic field components that are out of time phase may generate non-cancelling eddy currents that are likewise out of time phase, and such eddy currents contribute to the generation of the spurious quadrature electro-motive force.

Thus, both the desired real functional induction effects and the undesired spurious induction effects in the secondary winding are of a quadrature nature relative to the voltage in the primary winding. The real and the spurious quadrature voltages are additive. However, by the principles of this invention, the undesirable spurious quadrature induction effects are separately counterbalanced and substantially suppressed or eliminated in the secondary winding 12.

In the modification illustrated herein, for the purpose of the present invention, the existence of such spurious quadrature voltage in the secondary winding 12 is detected by measurement while the rotor is at rest. As will be explained below, the net effect of the flux field components and the eddy currents may be to induce the spurious quadrature voltage in one direction or in the other in the secondary winding, depending upon the structural or assembly idiosyncrasies of each individual generator. The energization of control winding 15 is therefore selectively applied to enable control winding 15 to inductively affect the secondary winding 12 in a negative sense relative to the spurious quadrature voltage, by inducing a quadrature voltage component in the secondary winding 12 that will counteract and suppress or eliminate the spurious quadrature voltage in that secondary winding 12.

As shown in the exploded view of Figure 2, an annular magnetizable core 21 for the primary winding 11, and a similar core 22 for the secondary winding 12 are disposed concentrically about a central axis of rotation 16, and are dimensioned and spaced to define the narrow cylindrical air-gap 14 within which the cylindrical rotor cup 13 fits for free rotation by the supporting drive shaft 17, which is arranged to be connected to an external driving device (not shown) whose angular speed is to be measured for purposes of indication, recording, or control, for use in computing devices, or the like.

A typical construction is shown in more detail in Figure 3, which represents a vertical longitudinal section of an actual tach generator to which this invention has been applied.

As shown in Figure 3, a tach generator 20 comprises the primary stator core 21 which accommodates the primary winding 11, and the secondary core 22 which accommodates the secondary winding 12. The two cores 21 and 22 are cylindrical and are separated by the small cylindrical air gap 14 defined by the adjacent peripheral contours of the two cores 21 and 22 within which the rotor cup 13 is co-axially disposed.

The rotor cup 13 is made of non-magnetizable material, such as copper or aluminum, and is supported at one end of an annular web 24 extending radially from a hub 25. The hub 25 slip-fits over a shank section 26 of the shaft 17, and is provided with two diametrically opposed notches 27 to press against a positioning reaction pin 28 extending through the shaft shank section 26. The hub 25 of the cup is then locked in position on the shaft section 26 by a locking assembly 29 that threads onto a threaded portion 31 of the shaft 17.

The air-gap 14 is just a few thousandths larger radially than the thickness of the cup 13 for a most efficient inductive relation between the primary and the secondary windings 11 and 12.

The outer or secondary core 22 is disposed and mounted within an outer encircling housing 33. At its right hand end the housing 33 is provided with a seating shoulder 34 to receive and seat an annular ring 35 which is then held locked in position on its seat 34 by a peened-over peripheral edge 36 at the outer end of the housing 33.

The ring 35 serves as a fixed supporting bracket for an end plate 37 which is provided with a hollow cylindrical hub 38 for a bearing 39 for one end of the shaft 17. The hub 38 is provided with a co-axial cylindrical extension 41 which serves as a concentric supporting bracket for the core 21 for the primary winding 11. The space within the hollow cylindrical extension 41 is utilized for the shaft and for part of the hub 25 that supports the rotor cup 13.

The bearing 39 for the shaft 17 may be locked in position in the supporting plate 37 by suitable means illustrated herein as a snap ring assembly 42. The supporting plate 37 is shown mounted on and secured to the anchoring ring 35 by suitable means such as several bolts 43, of which only one is shown in Figure 3. In order to maintain optimum operating conditions in the generator, as a measuring instrument, it is desirable to maintain a uniform operating temperature in the instrument, where it may be subjected to varying ambient temperature, as for example on an aircraft. Suitable heating elements and thermostatic equipment may be employed in the device, which are not part of the present invention, and which may be mounted on the supporting end plate 37 by means of an auxiliary bracket 44, which is shown mounted and supported on the end plate 37 by suitable mounting screws 45.

At the front end of the generator the shaft 17 is supported in a front bearing 49 that is suitably held in proper concentric position by an end bracket 51 which is seated against a shoulder seat 52 of the housing 33 and then locked in such seated position by a peened over section 53 of the outer housing 33. Bearing 49 is shown locked in position in the end plate 51 by a suitable snap ring 54.

In order to compensate for various manufacturing differences in spacing after the formation and positioning of the windings of the secondary core 22, use may be made of one or more shims 55.

As will be explained below, the secondary stator core 22 should be critically aligned with respect to the primary core 21, in order that the secondary winding 12 shall be disposed in electrical quadrature relative to the primary winding 11 when the tach generator is assembled during manufacture. The two cores 21 and 22 should then be locked in such relative position, to maintain the critical alignment.

In order to hold the primary winding in its core 21 in proper relative position on its supporting structure, the plate 37 and the bracket 41, the core 21 is first properly positioned on its immediate supporting structure, the cylindrical extension 41, and then is anchored in such pre-determined position on the cylinder 41 by a suitable plastic insulating material 57 which serves both to insulate the winding from the supporting structure, and to hold the winding and the core rigidly in place on such supporting structure 41.

The electrical and magnetic relations between the several windings may now be better understood from the subsequent figures of the drawings.

In Figure 4 is shown a schematic transverse view of broken-away upper portions of the two concentric cores 21 and 22, that respectively support the input winding 11 and the output winding 12. The radial spacing of the two cores 21 and 22 locates and defines the air gap 14 within which the rotor cup 13 is disposed for rotation. A portion of the rotor is indicated in the upper part of the gap 14.

In the tach generator herein specifically illustrated, both cores 21 and 22 are provided with twelve symmetrically angularly spaced slots group-numbered 61–1 to 61–12 and 62–1 to 62–12, respectively, where necessary in the two cores. Each winding 11 and 12 consists of six coils connected in series, numbered 11–a to 11–f, and 12–a to 12–f, respectively. The several coils of output winding 12 are all similar, and are symmetrically disposed around the core in the manner illustrated in Figure 4.

In the primary winding 11, however, only the first five coils are alike, but the sixth coil is sub-divided, in the manner illustrated in the diagram in Figure 5, to permit a simple tap connection to be made at a point on the coil only a few turns from the terminal end of the winding 11, to provide a voltage between that tap point and the adjacent terminal for energizing the control or correction winding 15, as will be further explained in the description of Figure 5.

As is further illustrated in Figure 4, the coils of one winding, for example winding 11, are physically offset ninety electrical degrees from the corresponding coils of the other winding, here winding 12. The electrical spacing of ninety electrical degrees corresponds to an angle of one slot pitch in this modification, because of the coil pitch, which spans two slots and represents one hundred eighty electrical degrees.

Considered in another way, the several coils of each winding 11 and 12 are disposed in the odd-numbered slots of the two cores. That is, for example, the first coil of each winding 11 or 12 is disposed in slots S–1 and S–3, of the cores 21 or 22, the second coil in slots S–3 and S–5, etc. The final or sixth coil of each winding is in slots S–11 and S–1. The respective coils are thus similarly arranged with respect to the slots in the separate individual cores. However, in order to establish quadrature or 90° electrical spacing between the windings on the two cores, the cores may be considered to be angularly shifted one slot relative to each other, so slot S–1, for example, of the outer core 22 is in direct radial alignment opposite slot S–2 on the inner core 21.

The final or sixth coil 11–f of winding 11, lying in slots S–11 and S–1 of the inner core 21, is shown with two coil portions 65–a and 65–b. The small coil portion 65–b consists of only a few turns at the terminal end of winding 11, to provide a convenient tapping point at the juncture of the two coil portions. The control or auxiliary winding 15 corresponding to the correction winding 15 in Figure 1, is shown laid in slots S–12 and S–2 of core 21, relatively parallel physically, and in electrical time phase, with coil 12–f of winding 12, in core 22.

Referring now to both Figures 4 and 5, in the tach generator here considered, each coil in the winding 11 consists of 375 turns. The portions of the end coil 11–f, identified as section 65–a, consists of 365 turns, and the portion identified as 65–b consists of ten turns. The two coil sections 65–a and 65–b are connected in series. The junction 66 of the two coil sections 65–a and 65–b serves as a tap-off point to which a tap lead 67 is connected for appropriate connection to an external circuit, as will be explained later. The free end of the coil section 65–b constitutes the low potential terminal of the entire winding 11 and it is brought out as an outer terminal lead 68 for connection to an external circuit 75.

The correction winding 15 in Figure 4 is provided with two terminal leads 69 and 70, both of which are brought out to the terminal board of the generator, for selective connection to the tap coil 65–b. A resistor 71 of large value is provided in the circuit from the tap lead 67 to the correction winding 15. The resistor 71 may conveniently be formed from a proper length of wire having a low temperature coefficient of resistivity, and is appropriately twisted to be non-inductive, for connection to the correction winding 15 which is inherently inductive.

The resistance of resistor 71 is large relative to the impedance of correction winding 15. The current through the correction circuit thus lags the tap voltage by a very small angle determined by the ratio of the impedance of correction winding 15 to the resistance of resistor 71. As shown in Figure 8, the impedance of winding 15 may be taken as being represented by vertical vector 15–a and the resistance of resistor 71 by the horizontal vector 71–a, for the purpose of determining the ratio between them. Actually, in Figure 8, those two vectors 15–a and 71–a represent the voltage drops across the winding 15 and the resistor 71, respectively. The ratio of the two voltage drops constitutes the natural tangent of the angle of lag of the current in the correction winding 15–a behind the tap voltage derived from winding turns 65–b, and represented by the hypotenuse or vector 65–b in Figure 8.

In order to connect the resistor 71 to the correction winding 15, both terminals of the resistor 71 may be brought out to the terminal board of the generator, or alternatively, as is done here, one terminal of the resistor may be connected to the tap or junction point 66 internally, through lead conductor 67 and the other terminal of the resistor brought out, to constitute in effect, the tap lead which is to be connected to a selected terminal of the correction winding 15 to provide the desired polarity of quadrature correction voltage in winding 12.

The diagram in Figure 5 is intended to illustrate schematically the general relative circuit arrangement and phase relations between the several windings.

As shown in Figure 5, the primary winding 11 is provided with the six coils connected in series between two main terminals 73 and 74, to permit connection to an external energizing circuit 75. In the present conventional use of this type of tachometer generator, the external circuit 75 may be a source of alternating current of a frequency of 400 cycles per second. In the primary winding 11, all six coils have the same number of turns, in order to establish symmetrical excitation of the magnetic core 21 on which they are supported. The bottom coil is shown subdivided, however, as previously explained, into two coil portions 65–a and 65–b, in order to provide the tap-off point 66 to which the tap lead 67 is connected. The resistor 71, previously mentioned, is connected to the tap lead 67 at one terminal of the resistor, and the other terminal of the resistor is brought out by the conductor 77 for connection to one terminal of the correction winding 15.

The input winding 11 and the output winding 12 are shown in physical quadrature position in diagram of Figure 5 to represent the electrical quadrature relationship between the windings in the generator. The time phase position of the voltage in each winding 11, 12 and 15, respectively, is indicated by the dot-and-dash-center vector time-phase vector lines 81 and 82, respectively. Thus, the correction winding 15 is shown disposed in in-phase relation with winding 12, as indicated by parallel dot-and-dash vector lines 82 and 83. The terminals of the correction winding 15 are brought out to terminals 84 and 85, to permit the correction winding 15 to be connected to two terminals 77 and 77–a for connection to the outcoming lead from resistor 71 and to terminal 74 thereby connecting the correction circuit across coil section 65–b.

The correction winding 15 is disposed substantially parallel to coil 12–f, as shown in Figures 4 and 5, for optimum magnetic coupling between winding 15 and winding 12, to induce the correction voltage from winding 15 into winding 12 to counteract the spurious quadrature voltage component developed in winding 12 by out-of-phase and leakage components of flux from winding 11.

Reverting again to Figure 8, for the moment, the angle between vectors 71–a and 65–b is shown enlarged for clearness. The correction component voltage 15–a is close to quadrature position relative to vector 65–b. Thus, the correction voltage in correction coil 15 is substantially in quadrature with the voltage across coil 65–b and across primary winding 11, although the correction coil 15 is disposed parallel to coil 12–f of winding 12.

The correction winding 15 as thus disposed is normally unaffected by transformer induction action from primary winding 11, but is itself disposed to induce a voltage into the secondary winding 12 by transformer action. The corrective action of the voltage of the correction winding 15 on the spurious quadrature voltage in secondary winding 12 is thus obtained by appropriately energizing the correction winding 15 with a quadrature voltage component that will induce a quadrature voltage in the secondary winding in opposition to the spurious quadrature voltage in that secondary winding 12.

As initially explained above, the primary and the secondary windings 11 and 12 are physically spaced to be in electrical quadrature relation, so that no direct induction transformer action can take place between those two windings. It was also mentioned that a quadrature voltage is generated in the secondary winding 12, however, because of leakage fluxes and because of out-of-time phase magnetic flux field components from the primary winding 11, which cause various eddy current and other effects in the two magnetic cores and in the cup even at standstill, that result in spurious quadrature voltages in the secondary winding 12.

Figure 6:
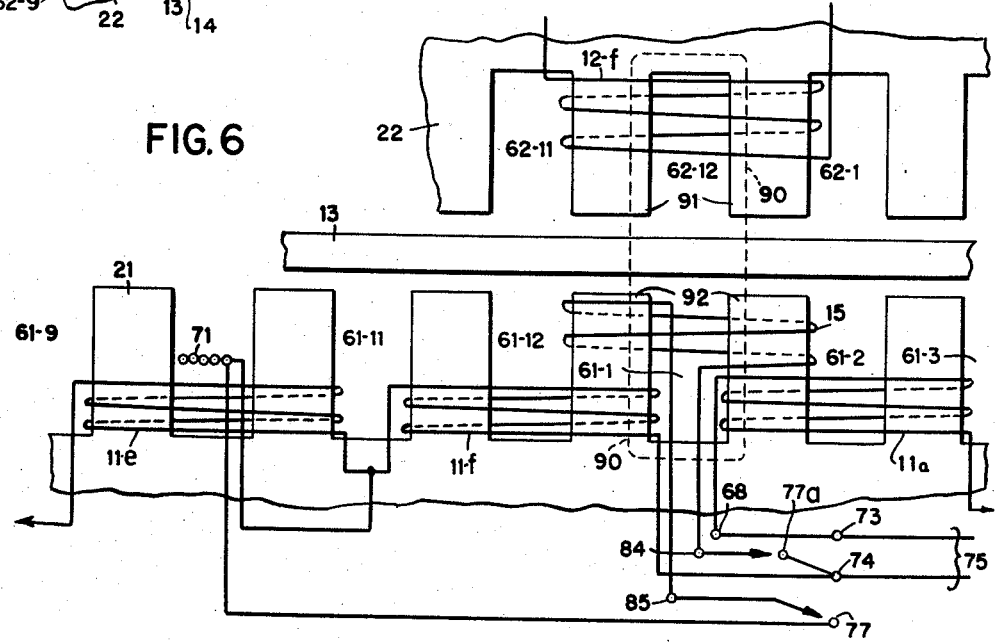
Figure 6 is a schematic development of portions of the two cores and shows the relative disposition of the windings, and the manner in which leakage fluxes are generated.

To further clarify the electro-magnetic action which causes such a spurious quadrature voltage in the secondary winding, Figure 6 shows a schematic development of a portion of each of the two cores 21 and 22, with one or more coils of the respective windings 11 and 12 in place, and also shows the disposition of the correction winding 15 and its resistive circuit.

To simplify the description, and to visually indicate the relationship between the two cores and their windings, the slots are numbered in the two cores, as indicated by the circled numerals, at the bottom of each slot in a series from 61–1 to 61–12, and 62–1 to 62–12, as may be needed for the description, on each of the cores 21 and 22.

As previously explained, in connection with Figure 4, the respective coils on winding 11 are similar and have a two-slot pitch to span between immediately adjacent odd-numbered slots. For example, one coil is disposed in slots 61–1 and 61–3, next coil in slots 61–3 and 61–5, and the disposition continues so until the last coil, which is shown disposed in slots 61–11 and 61–1.

Similarly, in core 22, the respective coils of the winding 12 are also disposed in immediately adjacent odd-numbered slots, only one coil being shown for the purpose of the present description.

The two cores 21 and 22 are then relatively shifted angularly through one slot pitch, so slot 61–1 of core 21 is opposite slot 62–12 of core 22. That physical shift is sufficient to place the coils of the winding 12 on core 22 physically in electrical quadrature relative to the opposite coils shown on the core 21. Correction winding 15 is thus shifted to proper phase position relative to the output winding 12, or relative to the corresponding coils of the output winding 12, to be able to establish transformer inductive action between the correction winding 15 and the juxtaposed opposite coil of the winding 12.

The manner in which the spurious quadrature voltage is developed in the secondary winding 12 may now be realized upon considering Figures 6 and 7. For example, in Figure 6, the broken dash line 90 threading the magnetic circuit through juxtaposed tooth pairs 91 and 92, on the two cores 21 and 22, may be taken to represent a line or tube of magnetic flux. The magnet-motive force for this flux line 90 is developed by the two coils 11–a and 11–f that each inter-link one of the two teeth of pair 92 on the core 21. The flux tube 90 does magnetically inter-link those two coils of the input winding 11, but does not inter-link the turns of the coil 12–f that encircles the two teeth of pair 91.

The flux tube 90 as thus shown in Figure 6 represents an ideal condition, where all magnetic flux paths are such that the flux field components would be in time phase.

Actually, however, inevitable slight manufacturing differences and irregularities in the laminations of the magnetic cores 21 and 22 cause slight differences in the reluctance characteristics of incrementally spaced individual paths in the flux field region. Some of those paths appear to have reluctance characteristics of a complex nature, with consequent quadrature or time delay effects on a component of the flux field traversing any such individual path. Consequently, the flux field lines resulting from such conditions may be random for each magnetic structure and may vary according to the structural idiosyncrasies of the cores and their relative positions. Thus, individual flux lines or flux field components will be out of time-phase with each other. The result is that the flux field from winding 11 is not symmetrical or uniform but ultimately does induce unbalanced voltage effects in winding 12.

An unbalanced flux field line or tube identified as 90–a will inter-link with the wall of the cup 13 and with the faces of the teeth of the two cores. That linking or cutting action of the flux tube 90–a is effective to induce local electrical fields that cause eddy currents in the cup and in the face and body of a tooth. Those eddy currents in turn establish magnetic fields that inter-link with and cut the turns of the juxtaposed coil of the secondary winding 12.

The manner in which the flux lines generate the eddy currents in the inter-linked surfaces, is illustrated schematically in Figure 7, where the irregular contour 13 represents a broken-away portion of the rotatable cup 13. The two portions of the flux line or tube 90–a are indicated by the usual symbols of the arrow tip and of the crossed feather in the small circles. Those flux tubes in turn cause the two eddy currents shown by the encircling contour lines 94 and 95. These contour lines 94 and 95 are shown circular, or effectively circular, in the rotor cup 13, but since the core structure is usually formed of laminations that are relatively thin, any corresponding current path in the laminations would be represented by contour paths that are relatively oval.

Since the out-of-phase components of the flux field, which are represented by flux line 90–a are generated by primary winding 11 independently of the operation of the rotor cup 13, the effects of those flux components would exist at all times as a spurious quadrature voltage unless curbed or counterbalanced.

The control winding 15 is therefore arranged to be energized by a current that will induce a voltage component in winding 12 in a direction to counter-act the spurious quadrature voltage.

The voltage in winding 15 is applied in appropriate direction to counter-act the spurious voltage induced in the output or secondary winding 12.

During manufacturing assembly, the two cores are angularly adjusted relative to each other and then fixed in position where minimum quadrature appears in winding 12 due to counteraction.

Thus, by means of such internal built-in control winding, a counter-acting voltage is developed to diminish or suppress the undesirable leakage flux quadrature voltage which would otherwise introduce an error in the voltage generated by the generator.

The invention is not limited to the specific details of assembly or disposition, nor to one control winding coil, since various modifications may be made without departing from the spirit and scope of the invention.

What is claimed is:

1. A tachometer generator to operate around an axis of rotation, and comprising an input stator core disposed concentrically about the axis and supporting an input winding to be energized from an external source; an output stator core supporting an output winding and concentrically disposed around said same axis and spaced from the input stator core to define a concentric cylindrical gap; a co-axial drive shaft; a rotor cup supported on the drive shaft and disposed concentrically in said gap, to be rotated by the shaft to energize the output winding by energy transferred from the input winding; and an auxiliary stationary winding disposed in the input core and energized from said input winding and operating to establish a voltage in the secondary winding to counteract undesired quadrature voltage components caused by induction in the secondary winding independently of the rotor cup action.

2. A tachometer generator comprising a primary winding to be externally energized; a second winding to be inductively energized from the primary winding only under certain running conditions; a rotor to be rotated by energy from an external source and to be operative, only during rotation, to transfer energy inductively from the primary winding to the secondary winding; and an auxiliary winding connected across a portion of the primary winding, and disposed to be inductively effective to induce quadrature voltages to depress quadrature voltages induced in the secondary winding by causes other than rotation of the rotor.

3. A tachometer generator comprising a primary winding to be excited from an external source; a rotor rotatable within the field of the primary winding; a secondary winding disposed in electrical quadrature inductive relation relative to the primary winding, to be energized from said primary by and during rotation of the rotor; and means for preventing induction of any spurious voltages in said secondary winding from said primary winding while the rotor is at rest.

4. A tachometer generator, as in claim 3, in which the preventing means comprises a circuit for deriving a quadrature voltage from the primary winding and for applying such derived voltage to either the primary winding or the secondary winding in a direction to prevent or limit undesired spurious voltages that would otherwise be induced in the secondary winding.

5. A tachometer generator, as in claim 3, in which the preventing means comprises an auxiliary winding disposed to derive excitation having a quadrature component from the primary winding, and disposed to induce a voltage into the secondary winding to enable said quadrature component to act in negative or bucking relation against spurious quadrature voltages in the secondary.

6. A tachometer generator comprising a primary winding; a secondary winding; a rotor cup rotatable between the two windings to transfer energy in electrical time quadrature from primary to secondary; and means responsive to a quadrature component of voltage derived from the primary winding for establishing a bucking effect in the secondary winding by such quadrature component to depress spurious quadrature effects of the primary induced into the secondary winding by action other than the rotor action.

7. A tachometer generator comprising a primary winding; a secondary winding; a rotor cup rotatable between the two windings to transfer energy from the primary to the secondary in time quadrature; and an auxiliary winding disposed to be energized from the primary winding to generate a time quadrature voltage component in the secondary winding in negative relation to spurious quadrature induction effects in the secondary winding from the primary caused by action other than that of the rotor.

8. A tachometer generator comprising a primary magnetizable core supporting a primary winding to be energized from an external source; a secondary magnetizable core supporting a secondary winding and separated from the primary core by a cylindrical air-gap and disposed to position the secondary winding in space phase quadrature to be normally non-responsive inductively to the direct flux field of the primary winding, but subject to indirect quadrature flux fields resulting from leakage flux fields from the primary winding; a rotor including a cup rotatable in the air-gap and serving to transfer energy from the primary to the secondary winding in time phase quadrature as a function of the speed of the rotor; an auxiliary winding energized from the primary winding, to receive quadrature excitation from the primary winding; and means constituting part of the primary core for supporting said auxiliary winding to induce a quadrature voltage into the secondary winding in negative relation to the quadrature voltage effects of the leakage flux, to suppress undesired quadrature voltage components resulting from such leakage flux.

9. A tachometer generator comprising a primary winding; a secondary winding; a rotor; and an auxiliary winding; in which the secondary winding is separated from the primary winding by a cylindrical air-gap, and is physically spaced to be in electrical quadrature relation relative to the primary winding in order to be normally unaffected by direct induction from the primary winding, but to be responsive only to quadrature induction effects caused by rotation of the rotor; and in which the rotor includes a cup disposed and rotatable in said cylindrical gap, and the cup is effective to transfer energy from the primary winding to the secondary winding only during rotation of the cup; and in which the auxiliary winding is energized from the primary winding to generate a small fixed quadrature voltage component, and is positioned to induce such quadrature component into the secondary winding in negative or bucking relation to any spurious quadrature voltages induced in the secondary winding while the rotor is at rest.

10. A tachometer generator comprising a primary stator core provided with a series of slots spaced symmetrically angularly about a central axis; a secondary stator core provided with a series of spaced slots also symmetrically angularly spaced around said axis, and said secondary core being spaced from the primary stator core by a narrow symmetrical air-gap concentric with said axis; a multi-coil winding symmetrically distributed in the slots of the primary core; a multi-coil winding symmetrically distributed in the slots of the secondary core, angularly shifted relative to the primary winding so the two windings are in electrical time quadrature relation; a co-axial rotatable shaft; a cup of non-magnetic material secured to the shaft to be driven thereby and disposed concentrically in the air-gap between the two cores to transfer energy from the primary into the secondary winding in time quadrature only during rotation; and means including an auxiliary winding energized from the primary winding to generate a voltage having a time quadrature component, said auxiliary winding being disposed on the primary core and being effective to induce said time quadrature component into the secondary winding as a corrective voltage to depress spurious quadrature voltages in the secondary winding not caused by cup action.

11. A tachometer generator as in claim 10, in which the means energized from the primary comprises an auxiliary winding disposed in slots of the primary core in electrical quadrature relative to the primary winding, and in direct inductive relation to the secondary winding; and means connecting said auxiliary winding into the circuit of the primary winding to generate a voltage in the auxiliary winding having a quadrature time component to cause the induction effect into the secondary to be in subtractive relation, to depress the amplitude of spurious quadrature voltages in the secondary winding.

12. A tachometer generator as in claim 10, in which the energized means include an auxiliary winding energized from the primary but disposed in slots of the primary core in electrical quadrature spacing from elements of the primary winding; and a resistive circuit connecting the auxiliary winding to the primary winding circuit and having circuit parameters to shift the phase of the current in the auxiliary winding relative to the phase of the current in the primary winding, to establish a directional quadrature voltage component in the secondary winding by induction from the auxiliary winding.

13. A tachometer generator having an axis of rotation and comprising a primary stator core and winding symmetrically disposed concentrically about said axis; a secondary stator core and winding symmetrically disposed concentrically about said axis, and angularly displaced to position the secondary winding 90 electrical degrees out of phase relative to the primary winding to substantially prevent transformer induction from the primary to the secondary winding, the two stator cores being dimensioned to define a concentric cylindrical air gap between the two cores; a rotor consisting of a rotatable shaft and a cylindrical cup of non-magnetizable material fitting into the air gap to be freely rotatable therein, and secured to the shaft to be rotated thereby, and serving to transfer energy from the primary to the secondary winding; an auxiliary winding disposed to be also non-responsive to transformer induction from the primary winding but connected to said primary winding to receive a quadrature voltage to then induce a quadrature voltage component in said secondary winding; and means for connecting said auxiliary winding into the circuit of said primary winding to energize the auxiliary winding with a quadrature component for induction into the secondary winding in a sense to suppress spurious quadrature voltages in the secondary.

14. A tach generator rotatable around a longitudinal axis, and comprising a primary slotted stator core having an even number of radial slots symmetrically angularly spaced and open to an air gap at the outer periphery of the core, a secondary slotted stator core having an equal number of radial slots symmetrically angularly spaced and open to said air gap at the inner periphery of the core; a primary single layer winding disposed in the odd-numbered slots of the primary core; a secondary single layer winding disposed in the odd-numbered slots of the secondary core; means supporting the two cores concentrically in angularly shifted relative positions at which the secondary winding is 90 electrical degrees out of phase with the primary winding to be free of transformer induction effects from the primary winding, said secondary winding being responsive, however, to spurious quadrature voltage effects caused by eddy currents induced in the secondary stator core by leakage flux from the primary winding, a rotor rotatable in the air-gap and operative during rotation to transfer energy, by quadrature induction field effects, from the primary winding to the secondary winding, but not operative to transfer energy by such induction effects while at rest in the air gap; and auxiliary means for deriving a quadrature excitation voltage component from the primary winding, independent of the rotor transfer quadrature effects, and for limiting the influence of such eddy-current quadrature voltage effects, in the secondary winding, by said quadrature excitation component.

15. A tach generator, as in claim 14, in which said auxiliary means includes a tertiary winding disposed on the primary core and connected into the circuit of the primary winding.

16. A tach generator, as in claim 15, in which the tertiary winding is disposed in slots in the primary core which support said tertiary winding in quadrature relation to said primary wnding.

17. A tach generator, as in claim 14, in which each core has twelve symmetrically spaced slots; each winding occupies the odd-numbered slots in its core; the two cores are angularly shifted one slot relative to each other; and the auxiliary means includes a tertiary winding disposed in at least one pair of even-numbered slots in the primary core, and is connected across a portion of the primary winding.

18. A tachometer generator to operate around an axis of rotation, and comprising an input stator core disposed concentrically about the axis and supporting an input winding to be energized from an external source; an output stator core supporting an output winding and concentrically disposed around said same axis and spaced from the input stator core to define a concentric cylindrical gap; a co-axial drive shaft; a rotor cup supported on the drive shaft and disposed concentrically in said gap, to be rotated by the shaft to energize the output winding by energy transferred from the input winding; and an auxiliary stationary correction winding disposed in the input core to be energized from said input winding and operating to establish a voltage in the secondary winding to counteract spurious voltages in the secondary winding.

19. A tachometer generator to operate around an axis of rotation, and comprising an input stator core disposed concentrically about the axis and supporting an input winding to be energized from an external source; an output stator core supporting an output winding and concentrically disposed around said same axis and spaced from the input stator core to define a concentric cylindrical gap; a co-axial drive shaft; a rotor cup supported on the drive shaft and disposed concentrically in said gap, to be rotated by the shaft to energize the output winding by energy transferred from the input winding; and an auxiliary stationary correction winding disposed in the input core and connecter to be energized from said input winding and operating to establish a voltage to counteract spurious quadrature voltages in the secondary winding.

No references cited.